June 12, 1956
H. B. SCHRAMM ET AL
2,749,937
EXCESS FLOW VALVE
Filed Oct. 14, 1952
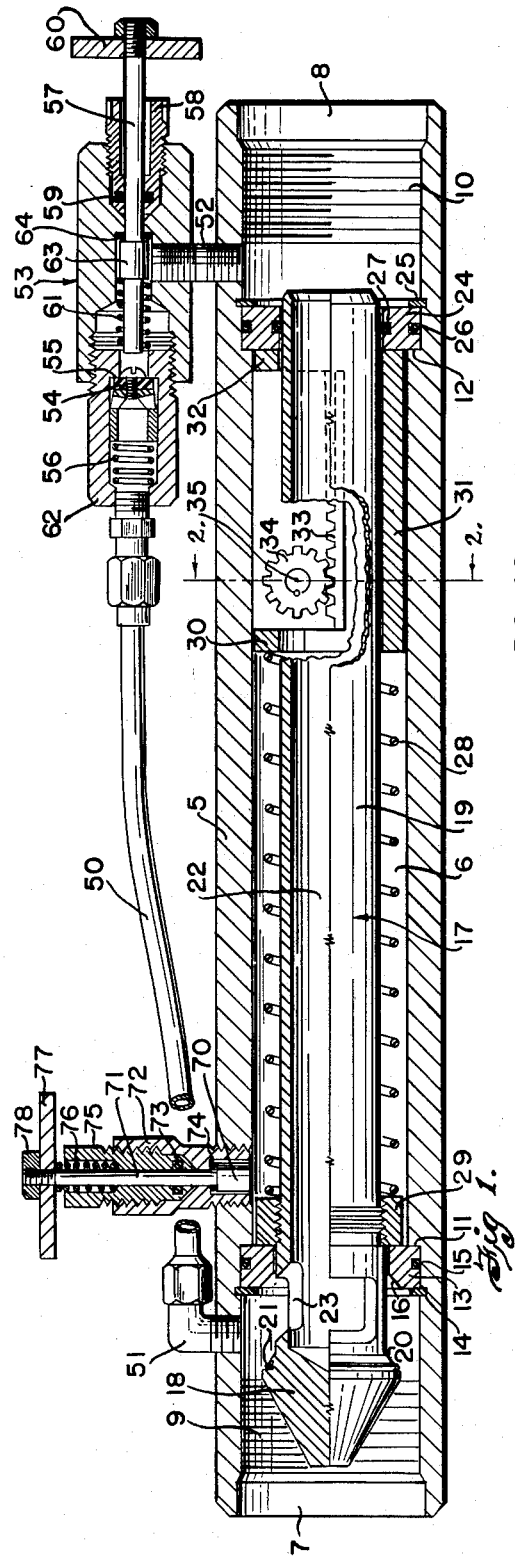
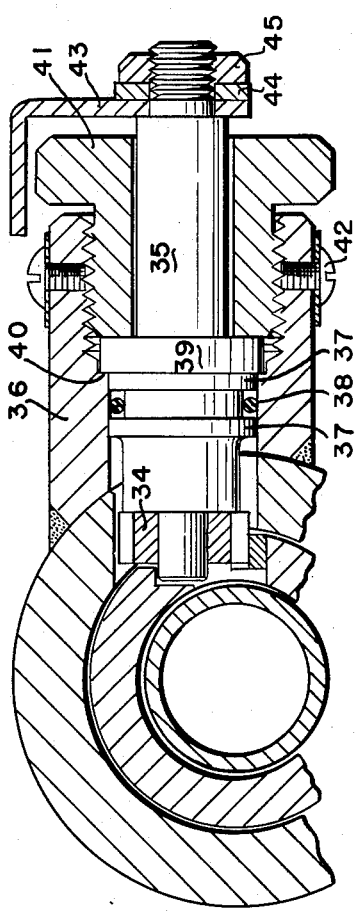
*INVENTORS:*
HARRY B. SCHRAMM
JOHN V. FREDD
HERBERT C. OTIS, SR.
BY *Browning & Simms*

United States Patent Office 2,749,937
Patented June 12, 1956

2,749,937

EXCESS FLOW VALVE

Harry B. Schramm, John V. Fredd, and Herbert C. Otis, Sr., Dallas, Tex., assignors to Otis Engineering Corporation, Dallas, Tex., a corporation of Texas Application October 14, 1952, Serial No. 314,614

1 Claim. (Cl. 137—460)

This invention relates to an excess flow valve and particularly to one adapted to be used in controlling the flow of liquefied petroleum gas such as propane, butane and the like.

In many liquid transfer systems, such as in those handling liquefied petroleum gases, it is desirable to employ an excess flow valve which is adapted to close upon the occurrence of a predetermined maximum rate of flow therethrough. Thus, for example, in systems where propane or the like is pumped from a source of supply, it is common to install an excess flow valve in the discharge conduit from the pump. Then should the pressure downstream of the pump fall to a relatively low value, as would happen if the discharge conduit should break or rupture, the excess flow valve will automatically close and prevent excessive loss of fluid from the system. Of course, excess flow valves have other uses of which the above is meant to be merely illustrative.

In some liquid transfer systems, it would be desirable to possess a valve having axially aligned inlet and outlet ports so that flow through the valve could be in a straight line with the conduit in which it is installed. Such an in-line arrangement does not require any substantial change in direction of liquid flow and hence reduces the pressure drop across the valve. The in-line arrangement is particularly advantageous where the valve is to be installed in a straight run of pipe in that it does not require extensive piping connections for its installation. This is particularly true where space is at a premium because the valve can be close connected between a fluid supply and receiver which need be separated apart only a little more than the length of the valve.

Further, it would be desirable to possess an excess flow valve whose closing characteristics are readily adjustable even while the valve is in service. Thus, for example, it is at times required to adjust an excess flow valve so that it will close at a different maximum flow rate than for that at which it was originally set.

It is, therefore, an object of this invention to provide an excess flow valve which is so constructed and arranged that it can be readily adjusted, even while in service, to close at different maximum pressure differentials.

Another object of this invention is to provide an excess flow valve having an in-line arrangement of its flow passage with the inlet and outlet flow openings of the valve and wherein provision is made to change the closing characteristics of the valve even while in service.

Another object of this invention is to provide an excess flow valve wherein the inlet and outlet ports are substantially coaxial with each other and with the flow passage through the valve thereby permitting substantially straight line flow of fluid through the valve and further permitting easy installation of the valve in a straight run of pipe.

Another object of this invention is to provide an excess flow valve wherein a valve member is urged to seated position by a pressure differential and is urged toward unseated position by a resilient means, such as a spring, the urging force of the resilient means being readily adjustable through a mechanism having an actuating part extending through the valve body.

Another object of this invention is to provide an excess flow valve wherein a valve member is seated responsive to the occurrence of a predetermined pressure differential thereacross and is urged from the seat by a resilient means, there being provided a movable part for adjusting the urging force of the resilient means and a mechanism for moving such part by the application of force externally of the valve body.

Another object of this invention is to provide such an excess flow valve in combination with a flow by-pass around its seat whereby the valve can be opened by merely opening the by-pass to equalize the pressure across the valve seat.

Another object of this invention is to provide an excess flow valve having a valve member movable to seated and unseated position responsive to pressure drop thereacross and wherein there is provided a releasable stop for holding the valve member in open position to avoid accidental closing of the same when a pressure surge is expected such as when starting a pump.

Other objects, advantages and features of this invention will be apparent to one skilled in the art upon a consideration of the written specification, the appended claim, and the attached drawings wherein:

Fig. 1 is a longitudinal cross-sectional view of a preferred embodiment of the valve of this invention with some of the parts broken away to better illustrate their construction and arrangement; and Fig. 2 is a partial cross-sectional view taken on the line 2—2 of Fig. 1.

Like characters of reference are used throughout each of the views to designate like parts.

Referring to the drawings, there is illustrated an excess flow valve having a valve body 5 through which extends a longitudinal passage 6 having an inlet port or flow opening 7 and an outlet port or flow opening 8 coaxial with each other and with flow passage 6. The inlet and outlet ends of the valve body can be threaded internally as at 9 and 10 to permit the valve to be made up into a flow line.

The valve body 5 has increased internal diameter portions at each of its ends to thereby form spaced apart shoulders 11 and 12. Against shoulder 11 and within passage 6 is disposed an annular valve seat 13 maintained in place by a snap ring 14 fitting into a groove in valve body 5. Valve seat 13 is provided with means forming a seal with the valve body, such as O-ring 15, received in an external groove in the valve seat. It will be noted that the valve seat is bevelled or flared inwardly as at 16 to provide an annular conical seating surface for the valve member described in detail below.

The valve member designated generally by the numeral 17 comprises a head piece or seating portion 18 carried on a tubular portion 19. Seating portion 18 is formed with an annular conical face 20 corresponding in shape to the bevelled portion 16 of seat 13 and has a sealing means, such as O-ring 21, disposed in an annular groove at the outer edge of face 20. Thus, when face 20 is moved to seat on bevelled portion 16, O-ring 21 first contacts the bevelled portion and forms a fluid-tight seal between the valve member and the valve seat.

Tubular portion 19 extends downstream from seating portion 18 and provides a passage 22 through which is passed substantially all of the liquid flowing through the valve and this passage can be considered as a restricted passage relative to ports 7 and 8 and passage 6. Inlet ports 23 are provided between passage 22 and the valve body upstream of seat 13 when the valve member is in unseated position. Hence, these inlet ports are situated adjacent seating portion 18 downstream of face 20 and seal 21. With such construction, liquid can flow from inlet port 7 through valve member inlet ports 23 and passage 22 to outlet port 8 of the valve body when the valve member is in unseated position. However, when the valve member is in seated position with seal 21 pressing against bevelled portion 16 of seat 13, flow can no longer take place through the valve member inlet ports 23 and passage 22. It will be noted that seal 15, as well as seal 21, seals against flow through valve body 5 with the valve member seated.

Tubular portion 19 of valve member 17 is supported at one end by valve seat 13 but does not have a fluid-tight fit therein. Hence when the valve member is in unseated position, fluid can flow between the valve member and the seat 13. To limit such flow, means are situated downstream of the valve seat to provide a substantial but not necessarily perfect seal between the valve member and valve body 5. Such means also supports the valve member and prevents its hanging and binding in seat 13. As illustrated in Fig. 1, this means can comprise an annular ring 24 abutting shoulder 12 and maintained in place by a snap ring 25 which is situated in a groove in the valve body. A sealing means such as O-ring 26 is provided between ring 24 and the valve body to effect a seal therebetween. An additional O-ring 27 is provided in an internal groove in ring 24 and effects a sliding seal with tubular portion 19 of the valve member. This seal is preferably of a relatively hard material such as an oil resistant type of rubber so as to permit relatively easy longitudinal movement of the valve member and at the same time to limit flow between ring 24 and tubular portion 19 of the valve member. It is preferred that seal ring 27 not have an excessively frictional contact with the valve member because friction tends to make the valve member insensitive to pressure differentials and excessive friction will make the operation of the valve member erratic. On the other hand, a certain amount of frictional engagement between ring 27 and the valve member is required to limit flow between the valve member and ring 24. It has been found in practice to be desirable to minimize the frictional contact between O-ring 27 and the valve member and to permit a limited amount of leakage past this seal ring, such leakage, of course, being of substantially negligible volume compared to the volume of fluid flowing through passage 22 of the valve member.

Resilient means are provided for urging the valve member toward unseated position so that the valve member will be maintained in such position at flow rates below the predetermined maximum flow rate at which it is desired the valve to be closed. Such means can comprise a spring 28 disposed around tubular portion 19 of the valve member and abutting one of its ends against a nut 29 screwed to the valve member as shown. This nut also serves as a stop in that it will abut the downstream side of seat 13 to thereby limit the extent of unseating of the valve member. The other end of the spring is carried by a movable part 30 which, as will be more fully explained below, is adjustable in position so as to permit adjustment of the urging force of the spring on the valve element.

From the foregoing, it will be apparent that flow through the valve and valve member will result in a pressure differential between the fluid pressure upstream of the valve member and the fluid pressure downstream thereof. In other words, considering passage 22 as being a constricted passage through the valve, there will exist a pressure differential between the fluid pressures upstream and downstream of this restricted passage. This pressure differential will urge the valve member toward seated position and, when it becomes large enough, the valve member will actually be seated to block flow through the valve. Thereafter, any increase in pressure differential will cause the valve member to become even more tightly seated. The downstream fluid pressure will be effective across an area substantially equal to the cross-sectional area of tubular portion 19 intersected by a radial plane containing seal ring 27 and this pressure will urge the valve member toward unseated position. On the other hand, the pressure upstream of the valve member will be effective across a substantially equal area and will urge the valve member towards seated position. In this manner, valve member 17 is provided with opposing surfaces exposed to fluid pressure upstream and downstream thereof. It will be evident that the downstream pressure which urges the valve toward unseated position will be augmented by the force of spring 28 so that the valve will remain open until the force of the upstream pressure acting against the valve member to seat the same exceeds by a predetermined amount the force of the downstream pressure acting against the valve member plus the force of the spring. It will also be apparent that not only will the pressure drop across the valve member be dependent upon the rate of flow therethrough but will also be dependent upon the cross-sectional area of passage 22 as well as the length of the tubular portion 19 of the valve member and the size of the inlet ports 23. Thus it is possible by altering these variables to take substantially any pressure drop desired across the valve and yet have it function as an excess flow valve.

It is believed obvious that the pressure drop across ports 23 may be held to a minimum by increasing the size of the ports. This will, of course, require considerable throw of the valve member between open and closed position and the use of a resilient means having a low rate relative to the throw of the valve member to prevent excessive build-up in the urging force of the resilient means as the valve member moves toward its seat. As illustrated in the drawing this may be readily accomplished by the use of a spring 28 which is relatively long by comparison with the throw of the valve member 17 as will be readily understood by those skilled in the art.

In accordance with one feature of this invention, means are provided for adjusting the position of movable part 30 with respect to seat 13 so as to vary the opening force of spring 28 and thereby the maximum pressure differential required to close the valve. Preferably this means includes a shaft extending transversely of the body and journaled therein for rotational movement only, and a motion conversion mechanism between the shaft and spring transmitting straight line movement to one end of the spring as a linear function of the rotation of the shaft. Such means can include a half-sleeve 31 connected to part 30 and having a ring 32 disposed at an end opposite part 30 to maintain the sleeve in proper alignment in the valve body. The half-sleeve carries a rack 33 on a cutout portion at one side thereof. Cooperating with the rack is a pinion 34 keyed to a shaft 35 which extends externally of the valve housing in such a manner that the shaft can be rotated to cause pinion 34 to advance rack 33 and part 30 to change the urging force of spring 28. The pinion constitutes a drive member with its periphery concentric with the shaft. The rack 33, of course, engages the periphery of pinion 34 and transmits straight line movement to one end of the spring. Thus shaft 35 extends into a housing extension 36 and has a pair of annular shoulders 37 forming a groove therebetween adapted to receive a sealing means such as O-ring 38. Shaft 35 has an additional shoulder 39 which is in sliding abutment with shoulder 40 on housing extension 36 and a lock gland nut 41 threaded into the housing extension. Locking screws 42 are provided to engage nut 41 to prevent its disengagement from the housing extension. A pointer 43 can be connected by lock washer 44 and nut 45 to the outer end of shaft 35 thereby providing an indicia means for determining the relative position of part 30 and rack 33 with respect to housing 5. With this construction, it will be apparent that shaft 35 can be turned by the application of force externally of valve body 5 to move part 30 and thereby adjust the force exerted by spring 28 on valve member 17. Such adjustment can be readily effected even while the valve is in service. It will be appreciated that in order to vary to any considerable extent the closing pressure for valve member 17 will require considerable change in the length of spring 28. It will further be appreciated that the desired change may be readily and easily effected with a small diameter drive member such as pinion 34 as rotational movement of shaft 35 is transmitted to the spring as a linear function of such rotation. This concept makes possible for the first time the adjustment of the urging force of the loading means in an inline excess flow valve in which the valve member has considerable throw between its seated and unseated position.

A by-pass passage or conduit is provided around seat 13 so that pressure can be equalized across the seat when the valve member is seated to thereby permit spring 28 to move the valve member to unseated position. The by-pass passage can comprise a conduit 50 having a connection 51 with the valve body upstream of seat member 13 and a connection 52 with the valve body downstream of the seat and in communication with the discharge end of tubular portion 19 of the valve member. A valve, designated generally by the numeral 53, is provided in conduit 50 to control flow therethrough. Such valve comprises a check valve combined with means for unseating the check valve element when desired. The check valve element 54 is urged against seat 55 by a spring 56. Stem or push pin 57 extends through gland nut 58 and has seal ring 59 forming a seal therewith. A handle 60 can be provided to facilitate actuation of the stem. Stem 57 is biased away from check valve element 54 by a spring 61 abutting one of its ends against the inner end of fitting 62 and the other end against an integral collar 63 on the stem. A seal element, such as O-ring 64, is provided between check valve body 53 and collar 63 to aid in forming a seal between stem 57 and the check valve body when the stem is in its retracted position as shown in the drawing. With this structure, fluid pressure exerted through conduit 50 will urge check valve member 54 toward seated position and is augmented by the seating force of spring 56. When it is desired to permit fluid to flow through the by-pass, stem 57 can be advanced to contact check valve element 54 and unseat the same. When it is desired to cease flow through the by-pass, stem 57 can be released and spring 61 will retract it to the position shown in Fig. 1 thereby permitting check valve element 54 to be reseated by spring 56 aided by the force of fluid pressure in conduit 50, if any.

While a particular type of check valve has been shown in the drawings, it is contemplated that any type of check valve embodying means for mechanically unseating the same irrespective of a pressure differential thereacross can be employed. In fact, any type of valve can be employed but a check valve is preferred because it reduces the likelihood of the by-pass being accidentally left open.

In many systems, there are encountered surges in the velocity of fluid flowing through the excess flow valve and this is particularly true when the excess flow valve is provided in the discharge of a pump. Upon starting such pump, a high discharge pressure and a surge of liquid flow is usually experienced upon first starting the pump after which the discharge pressure settles back to normal and the velocity of liquid flow decreases to normal operation. In many instances, such surge of pressure or liquid flow will be sufficient to close the excess flow valve before the surge has passed therethrough. To prevent this, a stop part is provided which is releasably engageable with the valve member when in unseated position to prevent its seating. Such stop part can comprise a part 70 adapted to be advanced to engage the valve member, as by being positioned behind nut 29, so that when the valve member 17 is in unseated position, a surge of pressure or liquid flow will merely press nut 29 against part 70 thereby preventing seating of the valve member. Stop part 70 is carried on a stem 71 housed in an extension 72 and sealed against fluid leakage by means of O-rings 73 and 74. Within gland nut 75 is a spring 76 urging stem 71 to the retracted position shown in Fig. 1. A handle 77 maintained in place by a nut 78 is connected to stem 71 to facilitate advancing the stem into the valve body. Spring 76 is made sufficiently strong so that when the manual actuating force is removed from handle 77, stem 71 will be retracted to its Fig. 1 position and out of engagement with the valve member. In this manner it becomes necessary for the operator to advance stem 71 by manual pressure and to hold the stem in advanced position during the time when it is desired to positively maintain valve member 17 in unseated position. Then upon release of handle 77, stem 71 will be automatically retracted to its Fig. 1 position by spring 76 ensuring against accidentally leaving stop part 70 in engagement with nut 29.

From the foregoing, it will be seen that there is provided an excess flow valve which can be constructed and arranged so that its longitudinal axis is coaxial with that of the flow conduit into which it is connected. Also, means are provided for adjusting the unseating forces of the valve member so that it can be made sensitive to different maximum flow velocities, such means being readily adjustable even while the valve is in service and not requiring dismantling of the valve or the changing of any parts therein. Also, the by-pass arrangement affords a means for readily opening the valve even though there exists a high pressure differential thereacross when in seated position. Further, the valve is adapted to be used in systems where there are encountered surges of fluid pressure or flow velocity of sufficient magnitude to normally close the valve.

From the foregoing it will be seen that this invention is one well adapted to attain all of the ends and objects hereinabove set forth, together with other advantages which are obvious and which are inherent to the structure.

It will be understood that certain features and sub-combinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

An excess flow valve which comprises, in combination, a valve body with a passage therethrough connecting axially disposed inlet and outlet flow openings of the body, a valve seat within the body passage, an elongate valve member having a seating portion being adapted to seat on the upstream side of said seat to block flow through the valve body and a tubular portion defining an annular space between the valve member and valve body passage, said tubular portion having an inlet thereto adjacent said seating portion so as to be upstream of the seat when the valve member is unseated, means in said annual space providing a sliding seal between the valve body and said valve member downstream of said inlet to the tubular portion thereof, opposing surfaces carried by the valve member so as to be exposed to fluid pressures upstream and downstream of said sliding seal means whereby the valve member is moved to seated position responsive to a predetermined differential between said fluid pressures, resilient means disposed in the annular space between the sliding seal means and inlet to the tubular portion urging said valve member to unseated position, a part disposed in such annular space and movable to vary the urging force of said resilient means on said valve member, a shaft extending through the valve body, and a rack and pinion connection between said shaft and movable part, said rack extending in the direction of movement of said part, whereby said part can be moved by the application of force to said shaft externally of the body to thereby vary the force exerted by said resilient means on said valve member.

References Cited in the file of this patent

UNITED STATES PATENTS

| | | |
|---|---|---|
| 294,334 | Reed | Feb. 26, 1884 |
| 1,517,894 | Ely | Dec. 2, 1924 |
| 1,683,720 | Larsonneur | Sept. 11, 1928 |
| 2,071,969 | Diescher | Feb. 23, 1937 |
| 2,136,898 | Thomas | Nov. 15, 1938 |
| 2,193,701 | Tabb | Mar. 12, 1940 |
| 2,238,374 | Sallee | Apr. 15, 1941 |
| 2,245,271 | Guill | June 10, 1941 |
| 2,258,295 | Merz | Oct. 7, 1941 |
| 2,411,392 | Saville | Nov. 19, 1946 |
| 2,418,743 | Baker | Apr. 8, 1947 |
| 2,447,827 | Turecheck | Aug. 24, 1948 |
| 2,515,516 | Kalen | July 18, 1950 |
| 2,593,802 | Schmitt | Apr. 22, 1952 |